United States Patent [19]

Föller

[11] 4,311,272
[45] Jan. 19, 1982

[54] BIMETALLIC CONTROLLED STEAM TRAP

[75] Inventor: Werner Föller, Stuhr, Fed. Rep. of Germany

[73] Assignee: GESTRA-KSB Vertriebsgesellschaft mbH & Co. KG, Bremen, Fed. Rep. of Germany

[21] Appl. No.: 176,179

[22] Filed: Aug. 7, 1980

[30] Foreign Application Priority Data

Aug. 8, 1979 [DE] Fed. Rep. of Germany ....... 2932114

[51] Int. Cl.³ .............................................. F16T 1/08
[52] U.S. Cl. ................... 236/59; 236/48 R; 236/93 R; 251/339; 251/359
[58] Field of Search .............. 236/59, 93 R, 101 R, 236/48 R; 251/339, 359, 333; 137/508

[56] References Cited

U.S. PATENT DOCUMENTS

| 2,271,850 | 2/1942 | Zinkil | 236/93 R X |
| 3,229,956 | 1/1966 | White | 236/48 R X |
| 3,568,710 | 3/1971 | Boyer et al. | 137/508 X |
| 3,591,138 | 7/1971 | Wolfe | 251/333 |
| 3,799,432 | 3/1974 | Schneider | 236/48 R |
| 3,817,450 | 6/1974 | Mischke | 251/333 X |
| 4,225,111 | 9/1980 | Stahle | 251/333 X |

FOREIGN PATENT DOCUMENTS 203053 7/1955 Australia ................................ 236/59

Primary Examiner—William E. Tapolcai, Jr.
Attorney, Agent, or Firm—Allison C. Collard; Thomas M. Galgano

[57] ABSTRACT

A steam trap has a bimetallic control element provided on the prepressure side and a locking part which is biased by the prepressure in the opening direction and which is actuated by the bimetallic control element. The bimetallic control element is provided with at least one bimetallic snap disk and the valve seat is stroke-movably positioned, whereby the maximum stroke path of the valve seat is only a part of the operating stroke of the locking part.

4 Claims, 3 Drawing Figures

BIMETALLIC CONTROLLED STEAM TRAP

The present invention relates to a steam trap. More particularly, it relates to a steam trap having a bimetallic control element provided on the prepressure side and a locking part which is biased in the opening direction by the prepressure and which is actuated by the bimetallic control element.

In such a steam trap, an intermittent manner of operation is desirable, i.e., an abrupt wide opening and also an abrupt complete closing. For this purpose, it is known, for example, to provide a large pressure admitting face downstream from the locking or closing part, so that the outflowing condensate exerts an additional opening force on the locking part and thereby may effect a further wide opening. However, this additional opening force is created only after a certain opening stroke of the locking part has been effected, i.e., after the flow of condensate has already begun.

Therefore, with small quantities of existing condensate, a balance situation is generated in this stroke area between the closing or locking forces of the bimetallic control element and the opening forces on the closing or locking part generated by the pressure. The locking part, in this case, remains in this throttle position and does not snap into the wide-open position. The consequence is that a high degree of wear and interfering polluting sediments deposit on the sealing faces of the locking part and the valve seat.

It is therefore an object of the invention to provide a steam trap of the aforementioned type, the locking part of which snaps to a wide open position from the locking position in a rapid manner, even when only small amounts of condensate are present and which again rapidly closes after the condensate is discharged.

This object of the invention is achieved by the provision of a steam trap of the aforementioned type wherein the bimetallic control element is provided with at least one bimetallic snap disk and the valve seat is stroke-movably positioned so that the maximum stroke path of the valve seat is only a portion of the operating stroke of the locking part.

Generally, bimetallic snap disks run through their stroke in essentially a jump-like manner. Therefore, they are suitable, per se, to effect an intermittent operation of the steam trap without a pressure admitting face downstream from the locking part. However, it had been found that the snap movement does not occur from the full locking force, i.e., from the end position of the locking part, so intermediate throttle opening positions may occur when only small amounts of condensate are present. In accordance with the invention, the stroke movable valve seat follows the locking part in the first critical stroke phase and therefore assures a reliable closing or locking. The locking force is the result of the available pressure load on the valve seat. During the first stroke phase, the bimetallic snap disk reaches a point where it completely snaps through to the other end position, with the stroke movement of the valve seat ending prior thereto.

During the closing or locking procedure, the locking part is snapped against the valve seat by the bimetallic snap disk, thus generating an immediate reliable closing or locking. During the remainder of the slow stroke movement of the bimetallic snap disk, the locking part is then lifted together with the sealingly-engaged valve seat. Therefore, disadvantageous intermediate throttle openings are always reliably prevented.

Other objects and features of the present invention will become apparent from the following detailed description when taken in connection with the accompanying drawing which discloses one embodiment of the invention. It is to be understood that the drawing is designed for the purpose of illustration only, and is not intended as a definition of the limits of the invention.

In the drawing, wherein similar reference characters denote similar elements throughout the several views.

Figure 1:
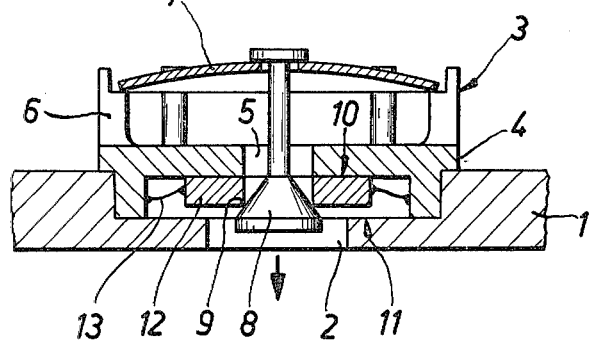
FIG. 1 is a sectional view of the control unit of the steam trap embodying the present invention in its closing end position.

Turning now in detail to the drawing, there is shown a separating wall 1 between the prepressure or high pressure side and the low pressure side of a steam trap housing (not shown) having a lead aperture 2 for the condensate to be discharged. A control unit 3 is mounted on wall 1 for controlling the flow through lead aperture 2.

Control unit 3 is provided with a base portion 4 having a central opening 5 and supports 6 for a bimetallic snap disk 7 provided on the prepressure side. Snap disk 7 actuates a locking part 8 which is biased in the opening direction by the prepressure and which cooperates with a valve seat 9. Valve seat 9 is provided on a stroke-movable annular element 12 which is disposed or limited movement between two stroke abutments 10 and 11. An annular membrane 13 is coupled in a pressure-tight manner with annular element 12 and base portion 4 by means of its inner and outer edges, respectively, thus preventing the medium from flowing laterally around annular element 12.

If steam is present on the prepressure side, then the bimetallic snap disk 7 is convexly upwardly arched and it retains the locking part 8 with a high degree of locking force against the valve seat 9. Thereby, annular element 12 is supported against stroke abutment 10 (FIG. 1). Consequently, steam cannot escape into lead aperture 2.

Figure 2:
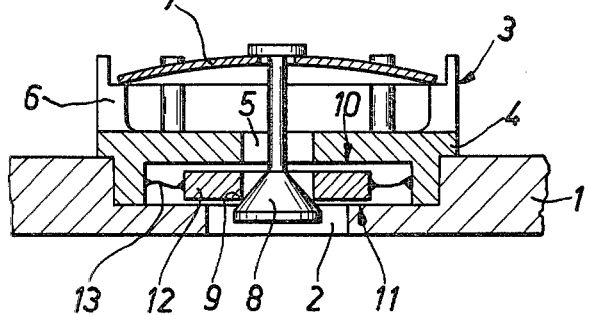
FIG. 2 is a comparable view to that of FIG. 1, but showing the control unit in an intermediary position.

As soon as bimetallic snap disk 7 is exposed to the condensate, the closing force of bimetallic disk 7 decreases due to the lower temperature and bimetallic snap disk 7, together with locking portion 8, initially executes a gradual slow stroke. The strok-movable annular element 12 follows locking part 8 under the action of the prepressure, so that in this phase, locking part 8 and valve seat 9 are still sealingly engaged (FIG. 2). Thereby, the effective locking force is defined by the pressure-admitted face of the annular element 12 and the pressure difference or differential pressure between the prepressure and the low pressure sides. In the meantime, bimetallic snap disk 7 reaches the state wherein it abruptly moves the remainder of the stroke path, thus rapidly moving locking part 8 into the opening position.

Figure 3:
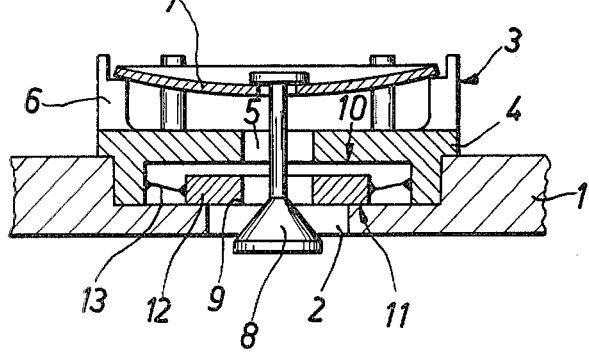
FIG. 3 is a comparable view to that of FIGS. 1 and 2, but showing the control unit in a complete open position.

At the same time, annular element 12 is prevented from a further stroke movement by stroke abutment 11 (FIG. 3). Therefore, the steam trap always opens from the secure closing position into the wide open position.

When bimetallic disk 7 is again heated to its locking temperature, after the discharge of the condensate, due to its exposure to the steam once again, it snaps from its concave configuration (FIG. 3) into its covex configuration (FIG. 2). As a result, locking part 8 comes into engagement with valve seat 9 and raises annular element 12 from stroke abutment 11. In this manner, a tight sealing is obtained at the sealing location 8,9. When bimetallic snap disk 7 slowly moves through the remainder of the stroke, the steam trap is already closed.

Disadvantageous intermediate throttle opening positions as they may occur during the presence of low amounts of condensate and constant opening and closing strokes of the locking part 8 are thereby reliably prevented in this manner. Despite the amount of condensate present, the steam trap exclusively operates in an intermittent manner, i.e., it always opens from the secure closing position into a wide open position and again completely closes from such a wide open position.

Thus, while only one embodiment of the present invention has been shown and described, it will be obvious that many changes and modifications may be made thereunto, without departing from the spirit and scope of the invention.

What is claimed is:

1. In a steam trap of the type including a housing having a separating wall in which is formed a lead aperture for establishing communication between the prepressure and low pressure sides thereof, a bimetallic control element mounted on said prepressure side, a valve seat, and a stroke-movable locking part disposed for cooperation with said valve seat which is biased in the opening direction and is actuated by said bimetallic control element, the improvement comprising:

said bimetallic control element including at least one bimetallic snap disk and said valve seat being provided on a stroke-movable element which is disposed for limited movement generally along a portion of the stroke of said locking part such that the maximum stroke path of said valve seat is only a part of the operating stoke of the locking part.

2. The steam trap according to claim 1, additionally including two spaced-apart stroke abutments, wherein said valve seat is provided on an annular element which is disposed between said two stroke abutments for free axial movement, wherein said control element has a base portion circumferentially surrounding said annular element and wherein sealing means is provided coupled to said annular element.

3. The steam trap according to claim 2, wherein an annular membrane serves as said sealing means, said membrane having an inner edge which is tightly coupled with said annular element and an outer edge tightly coupled with said base portion.

4. The steam trap according to claim 1, wherein one of said stroke abutments is provided on said base portion and wherein the other of said stroke abutments is provided on said separating wall of said housing.

* * * * *